(12) United States Patent
Shirley et al.

(10) Patent No.: US 8,736,847 B2
(45) Date of Patent: May 27, 2014

(54) METHOD AND APPARATUS FOR IMAGING

(75) Inventors: Lyle G. Shirley, Boxborough, MA (US); Jeffrey C. Marrion, Acton, MA (US)

(73) Assignee: Focused Innovation, Inc., Boxborough, MA (US)

( * ) Notice: Subject to any disclaimer, the term of this patent is extended or adjusted under 35 U.S.C. 154(b) by 427 days.

(21) Appl. No.: 13/189,349

(22) Filed: Jul. 22, 2011

(65) Prior Publication Data
US 2012/0019809 A1   Jan. 26, 2012

Related U.S. Application Data

(60) Provisional application No. 61/367,409, filed on Jul. 24, 2010, provisional application No. 61/435,283, filed on Jan. 22, 2011.

(51) Int. Cl.
*G01B 11/02* (2006.01)

(52) U.S. Cl.
USPC .......................................................... 356/510

(58) Field of Classification Search
USPC .......................................................... 356/510
See application file for complete search history.

(56) References Cited

U.S. PATENT DOCUMENTS

| | | | |
|---|---|---|---|
| 4,018,531 A | 4/1977 | Leendertz | |
| 4,145,140 A | 3/1979 | Fujii | |
| 4,191,476 A | 3/1980 | Pollard | |
| 4,632,554 A | 12/1986 | Pearce | |
| 4,854,706 A | 8/1989 | Claus et al. | |
| 4,913,547 A | 4/1990 | Moran | |
| 5,627,363 A | 5/1997 | Paxman et al. | |
| 5,811,826 A * | 9/1998 | Shirley | 250/559.29 |
| 5,870,191 A | 2/1999 | Shirley | |
| 6,031,612 A | 2/2000 | Shirley | |
| 6,076,010 A | 6/2000 | Boas et al. | |
| 6,188,482 B1 | 2/2001 | Cloud | |
| 6,188,483 B1 | 2/2001 | Ettemeyer | |
| 6,208,416 B1 | 3/2001 | Huntley et al. | |
| 6,690,474 B1 | 2/2004 | Shirley | |
| 6,777,684 B1 | 8/2004 | Vlokov et al. | |

(Continued)

FOREIGN PATENT DOCUMENTS

| | | |
|---|---|---|
| WO | WO2006069443 | 7/2006 |
| WO | WO2008048721 | 4/2008 |

(Continued)

OTHER PUBLICATIONS

USPTO, Non-Final Office Action for U.S. Appl. No. 12/921,185 mailed Oct. 9, 2013, 16 pages.

(Continued)

*Primary Examiner* — Tarifur Chowdhury
*Assistant Examiner* — Jonathon Cook
(74) *Attorney, Agent, or Firm* — John J. Brooks, III; John Brooks Law LLC

(57) ABSTRACT

A system that incorporates teachings of the present disclosure may include, for example, an apparatus that includes a processor coupled with a memory where the processor is operable to obtain a first speckled pattern of a first defocused image of a neighborhood of a location on an object, to obtain a second speckled pattern of a second defocused image of the neighborhood, to determine a shift between the first and second speckle patterns, and to calculate slope information of a surface profile at the location based on the determined shift. Other embodiments are disclosed.

43 Claims, 8 Drawing Sheets

(56) References Cited

U.S. PATENT DOCUMENTS

| | | | |
|---|---|---|---|
| 6,937,350 | B2 | 8/2005 | Shirley |
| 7,079,257 | B1 | 7/2006 | Kirkpatrick et al. |
| 7,367,705 | B2 | 5/2008 | McCollum et al. |
| 7,747,068 | B1 | 6/2010 | Smyth et al. |
| 8,265,375 | B2 | 9/2012 | Shirley |
| 2004/0100636 | A1 | 5/2004 | Somekh et al. |
| 2005/0024624 | A1 | 2/2005 | Gruhlke et al. |
| 2005/0070772 | A1 | 3/2005 | Cornsweet |
| 2005/0073693 | A1 | 4/2005 | DePue et al. |
| 2005/0190157 | A1 | 9/2005 | Oliver et al. |
| 2005/0200838 | A1* | 9/2005 | Shaw et al. ............... 356/237.1 |
| 2005/0200925 | A1 | 9/2005 | Brotherton-Ratcliffe et al. |
| 2005/0231465 | A1 | 10/2005 | DePue et al. |
| 2006/0132761 | A1 | 6/2006 | Hall |
| 2008/0055545 | A1 | 3/2008 | Clamp |
| 2008/0123106 | A1 | 5/2008 | Zeng et al. |
| 2008/0154524 | A1* | 6/2008 | Shirley ........................... 702/66 |
| 2011/0013198 | A1 | 1/2011 | Shirley |
| 2012/0019809 | A1 | 1/2012 | Shirley |

FOREIGN PATENT DOCUMENTS

| | | |
|---|---|---|
| WO | WO2009008745 | 1/2009 |
| WO | WO2009120643 | 10/2009 |
| WO | WO2012018568 | 2/2012 |

OTHER PUBLICATIONS

USPTO, Non-Final Office Action for U.S. Appl. No. 13/568,229 mailed Oct. 8, 2013, 11 pages.

WIPO International Bureau, International Preliminary Report of Patentability (IPRP), to PCT/US11/45085 mailed Jan. 29, 2013, 5 pages.

United States Intellectual Property Office, International Search Report and Written Opinion dated Aug. 7, 2008 to PCT Application No. PCT/US07/071416 to Shirley, Lyle G., International Filing Date Jun. 17, 2007, 13 pages.

PCT International Search Report and Written Opinion mailed Mar. 22, 2012, for PCT/US2011/045085, Authorized officer Jung Sung Yong.

Non-Final Office Action for co-pending U.S. Appl. No. 12/921,185, mailed Apr. 11, 2013, US Patent and Trademark Office, USA.

Lyle G. Shirley, Emory D. Ariel, Gregory R. Hallerman, Harold C. Payson, John R Vivilecchia, Advanced techniques for target discrimination using laser speckle, Lincoln Lab. J, vol. 5, No. 3, 74 pages, 1992.

Joseph C. Marron, Kirk S. Schroeder, Three-dimensional lensless imaging using laser frequency diversity, Applied Optics, vol. 31, Issue 2, pp. 255-262, Jan. 10, 1992.

Joseph C. Marron, Kirk S. Schroeder, Holographic laser radar, Optics Letters, vol. 18, Issue 5, pp. 385-387, Mar. 1, 1993.

Lyle G. Shirley, Gregory R. Hallerman, Applications of tunable lasers to laser radar and 3D imaging, Technical Report 1025, MIT Lincoln Laboratory, 140 pages, Feb. 26, 1996.

J.R. Fienup, Pauls. Idell, Imaging correlography with sparse arrays of detectors, Optical Engineering, vol. 27, No. 9, pp. 778-784, Sep. 1988.

Korean Intellectual Property Office, International Search Report and Written Opinion dated Dec. 21, 2009, to parent PCT Application No. PCT/US09/037999 to Shirley, Lyle G., International Filing Date Mar. 23, 2009. 10 pages.

Lyle G. Shirley, Gregory R. Hallerman, Nonconventional 3D Imaging Using Wavelength-Dependent Speckle, The Lincoln Laboratory Journal, vol. 9, No. 2, pp. 153-186, 1996.

Takeaki Yoshimura and Soichi Iwamoto, Dynamic properties of three-dimensional speckles, J. Opt. Soc. Am. A/vol. 10, No. 2, pp. 324-328, Feb. 1993.

N. Takai, Suntanto, and T. Asakura, Dynamic statistical properties of laser speckle due to longitudinal motion of a diffuse object under Gaussian beam illumination, J. Opt. Soc. Am., vol. 70, No. 7, pp. 827-834, Jul. 1980.

Ichirou Yamaguchi, Speckle displacement and decorrelation in the diffraction and image fields for small object deformation, Optica Acta, vol. 28, No. 10, pp. 1359-1376, 1981.

Pierre Jacqout and Pramod K. Rastogi, Speckle motions induced by rigid-body movements in free-space geometry: an explicit and extension to new cases, Applied Optics, vol. 18, No. 12, pp. 2022-2032, Jun. 15, 1979.

WIPO International Bureau, International Preliminary Report of Patentability (IPRP) for PCT Application No. PCT/US07/71416 dated Dec. 31, 2008 to Lyle Shirley, entitled "Method and Apparatus for Remote Sensing of Objections Utilizing Radiation Speckle" 9 pages.

USPTO, Office Action for U.S. Appl. No. 11/764,196 to Lyle Shirley, entitled "Method and Apparatus for Remote Sensing of Objects Utilizing Radiation Speckle", Office Action dated Oct. 25, 2010, 14 pages.

USPTO, Office Action for U.S. Appl. No. 11/764,196 to Lyle Shirley, entitled "Method and Apparatus for Remote Sensing of Objects Utilizing Radiation Speckle", Office Action dated Mar. 22, 2011, 10 pages.

WIPO International Bureau, International Preliminary Report of Patentability (IPRP), to parent PCT Application No. PCT/US09/037999 to Shirley, Lyle G., IPRP dated Sep. 28, 2010. 4 pages.

J.R. Fienup, Autocorrelation unfolding, Proc. of SPIE, vol. 373, Transformations in Optical Signal Processing, pp. 203-209, 1981.

J.R. Fienup, T.R. Crimmins, W. Holsztynski, Reconstruction of the support of an object from the support of its autocorrelation, Josa, vol. 72 Issue 5, pp. 610-624, May 1982.

Jeffery D. Barchers, Rapidly convergent phase-retrieval strategy for use with reflected laser light, Josa A, vol. 20, Issue 6, pp. 1013-1024, Jun. 2003.

T.R. Crimmins, J.R. Fienup, B.J. Thelen, Improved bounds on object support from autocorrelation support and application to phase retrieval, Josa A. vol. 7, Issue 1, pp. 3-13, Jan. 1990.

Richard G. Paxman, John H. Seldin, James R. Fienup, Joseph C. Marron, Use of an opacity constraint in three-dimensional imaging, Proc. of SPIE, vol. 2241—Inverse Optics iii, pp. 116-126, 1994.

James R. Fienup, Brian J. Thelen, Michael F. Reiley, Richard G. Paxman, 3D locator sets of opaque objects for phase retrieval, Proc. of SPIE, vol. 3170—Image Reconstruction and Restoration II, pp. 88-96, 1997.

J.R. Fienup, R. G. Paxman, 3-D imaging correlography and coherent image reconstruction, Proc. of SPIE, vol. 3815—Digital Image Recovery and Synthesis IV, pp. 60-69, Jul. 1999.

United Kingdom Intellectual Property Office, Office Action for co-pending App. No. GB1016236.0, dated Oct. 5, 2012. 2 pages.

United Kingdom Intellectual Property Office, Office Action for co-pending App. No. GB1016236.0, dated Jan. 30, 2012. 3 pages.

USPTO, Office Action for U.S. Appl. No. 11/764,196 to Lyle Shirley, entitled "Method and Apparatus for Remote Sensing of Objects Utilizing Radiation Speckle", Office Action dated Mar. 1, 2012. 12 pages.

USPTO, Notice of Allowance for U.S. Appl. No. 12/921,185 mailed Jan. 15, 2014, 9 pages.

USPTO, Final Office Action for U.S. Appl. No. 13/568,229 mailed Feb. 5, 2014, 18 pages.

* cited by examiner

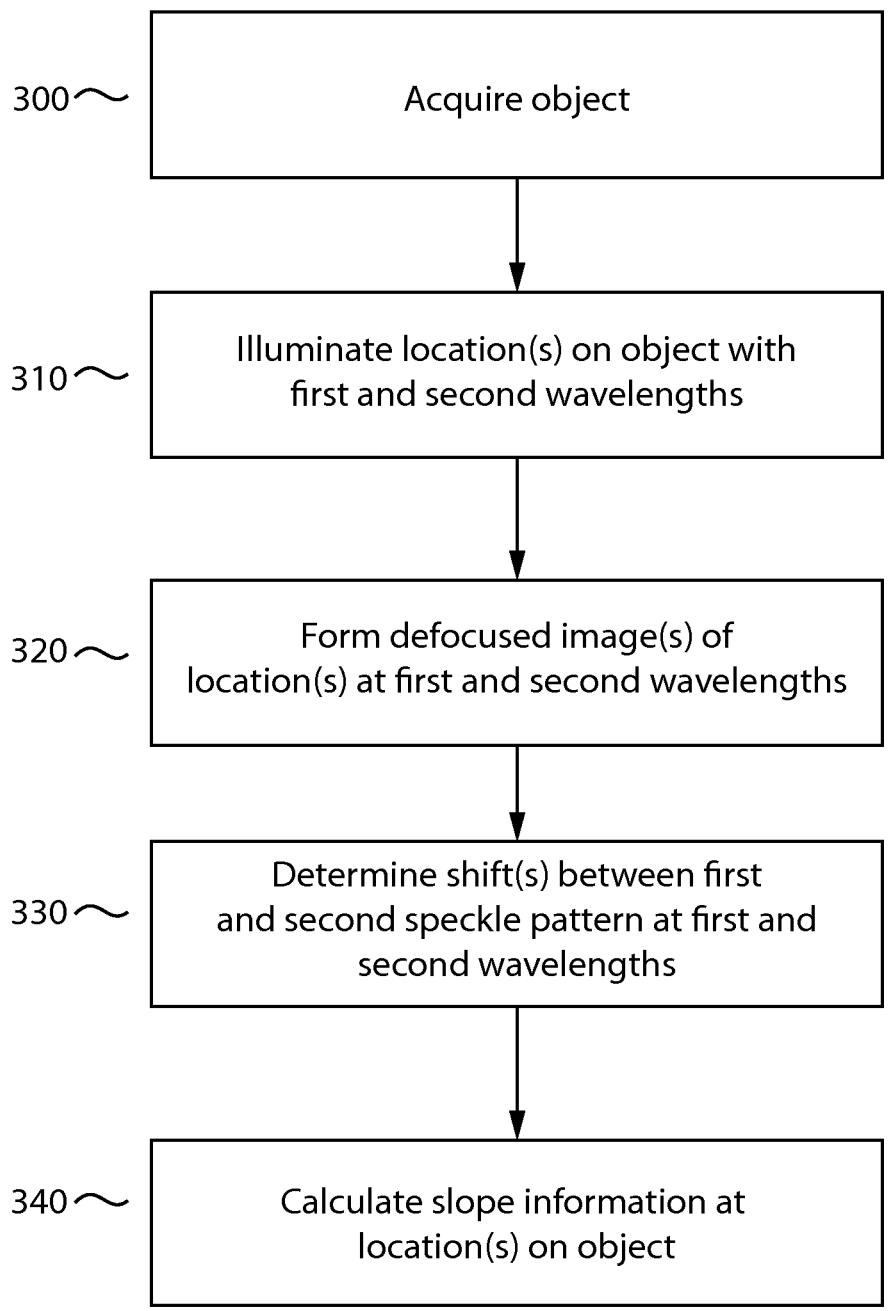

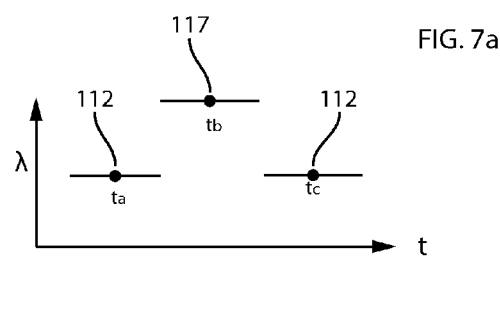
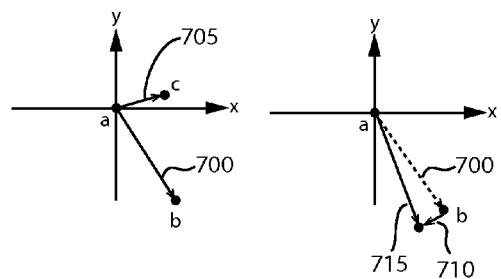
FIG. 7a
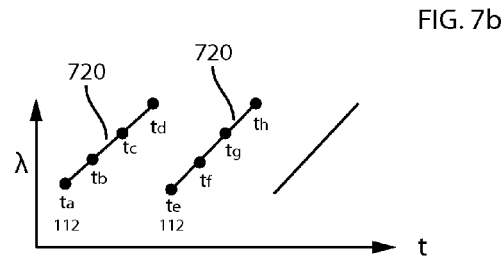
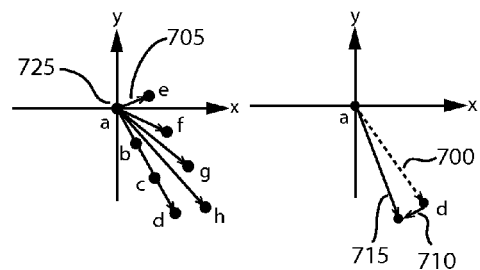
FIG. 7b
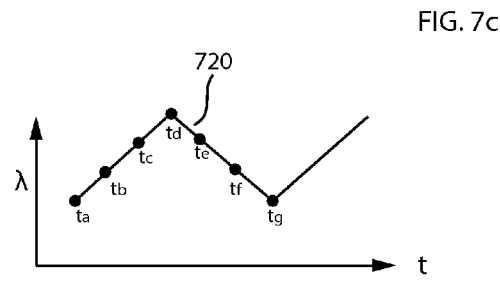
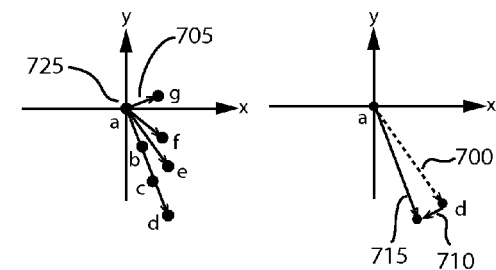
FIG. 7c

METHOD AND APPARATUS FOR IMAGING

CROSS-REFERENCE TO RELATED APPLICATIONS

This application claims priority to U.S. Provisional Patent Application Ser. No. 61/367,409 filed Jul. 24, 2010 and U.S. Provisional Patent Application Ser. No. 61/435,283 filed Jan. 22, 2011, the disclosures of which are hereby incorporated by reference in their entirety.

FIELD OF THE DISCLOSURE

The present disclosure relates generally to imaging, and more specifically to a method and apparatus for imaging.

BACKGROUND

Determining the properties of a surface of an object is useful in many fields, including identification, authentication, quality control and so forth. The ability to determine the properties quickly and easily is desirable. The ability to determine the properties with a high degree of accuracy, including correcting for errors introduced into the technique utilized for determining the properties, is also desirable.

BRIEF DESCRIPTION OF THE DRAWINGS

FIG. 1c depicts digital representations of speckle patterns obtained using the system of FIG. 1a;

FIG. 3 depicts an illustrative embodiment of a method for determining slope information associated with a location on an object;

FIG. 4b depicts an illumination array and defocused images obtained using the system of FIG. 4a;

FIG. 4c depicts another illumination array and defocused images obtained using the system of FIG. 4a;

FIG. 7a depicts an illustrative embodiment of graphical representations associated with methods for correcting relative motion between an object and an imaging system and estimating slope information;

FIG. 7b depicts an illustrative embodiment of graphical representations associated with methods for correcting relative motion between an object and an imaging system and estimating slope information;

FIG. 7c depicts an illustrative embodiment of graphical representations associated with methods for correcting relative motion between an object and an imaging system and estimating slope information.

DETAILED DESCRIPTION OF THE INVENTION

Figure 1A:
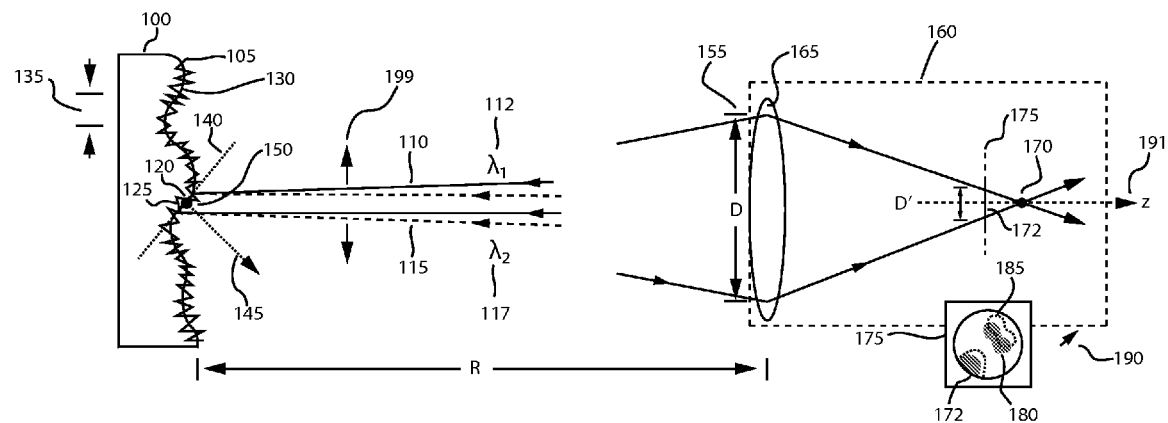
FIG. 1a depicts an illustrative embodiment of a system for performing imaging of an object.

A surface-slope sensing system will now be described in detail with reference to the accompanying drawings. It will be appreciated that, while the following description focuses on an optical surface sensing system that probes surface slope, the systems and methods disclosed herein have wide applicability and can be used for the determination of three-dimensional surface shape of complex objects that scatter radiation. The methods are not limited to the optical wavelength range and can apply generally to electromagnetic and acoustic waves. The exemplary embodiments can provide the capability of performing high-precision measurements at low cost without the shadowing and surface-access issues inherent in triangulation-based approaches. For example, the exemplary embodiments can provide for enhanced resolution compared with time-of-flight approaches that measure the transit time of radiation scattered from the surface of an object. The exemplary embodiments can apply to a wide range of measurement scales ranging from microscopic applications to laser-radar applications. Notwithstanding the specific example embodiments set forth below, all such variations and modifications that would be envisioned by one of ordinary skill in the art are intended to fall within the scope of this disclosure.

In one embodiment, a method can include illuminating a neighborhood of a location on an object with a first beam of coherent radiation at a first wavelength, and obtaining a first defocused image of the neighborhood illuminated with the first wavelength where the first defocused image comprises a first speckle pattern. The method can also include illuminating the neighborhood with a second beam of coherent radiation at a second wavelength, and obtaining a second defocused image of the neighborhood illuminated with the second wavelength where the second defocused image comprises a second speckle pattern. The method can additionally include determining a shift between the first and second speckle patterns, and calculating slope information of a surface profile at the location based on the determined shift.

In one embodiment, an apparatus can include a memory and a processor coupled with the memory. The processor can be operable to obtain a first speckled pattern of a first defocused image of a neighborhood of a location on an object where the first defocused image is obtained based on a first illumination of the neighborhood by a first beam of coherent radiation at a first wavelength. The processor can be operable to obtain a second speckled pattern of a second defocused image of the neighborhood where the second defocused image is obtained based on a second illumination of the neighborhood by a second beam of coherent radiation at a second wavelength. The processor can also be operable to determine a shift between the first and second speckle patterns, and to calculate slope information of a surface profile at the location based on the determined shift.

In one embodiment, a non-transitory computer-readable storage medium can include computer instructions for illuminating a neighborhood of a location on an object with a first beam of coherent radiation at a first wavelength. The computer instructions can enable obtaining a first defocused image of the neighborhood illuminated with the first wavelength where the first defocused image comprises a first speckle pattern. The computer instructions can enable illuminating the neighborhood with a second beam of coherent radiation at a second wavelength. The computer instructions can enable obtaining a second defocused image of the neighborhood illuminated with the second wavelength where the second defocused image comprises a second speckle pattern. A shift between the first and second speckle patterns can be determined. Slope information of a surface profile at the location can be determined based on the shift.

In reference to FIG. 1a, object 100 having a surface profile 105, can be illuminated with a first beam of coherent radiation 110 centered at a first wavelength $\lambda_1$ 112 and with a second beam of coherent radiation 115 centered at a second wavelength $\lambda_2$ 117. First beam of coherent radiation 110 and second beam of coherent radiation 115 can substantially overlap at location 120 lying on surface profile 105 and can illuminate the neighborhood 125 of location 120. The particular area of neighborhood 125 can vary depending on components utilized to generate first and second beams 110, 115. Surface profile 105 may contain detailed textural variations with high spatial-frequency content. Smoothed surface profile 130 can be a representation of surface profile 105 where spatial frequency components having periods nominally greater than a desired spatial-resolution limit 135 have been removed by filtering. Tangent plane 140 can be tangent to smoothed surface profile 130 at location 120. Surface normal 145 can be a unit vector normal to tangent plane 140. Tangent plane 140 or unit normal vector 145 can represent slope information of surface profile 105 at location 120. Illumination spot 150 on neighborhood 125 can be comparable in size to desired spatial-resolution limit 135.

Preferably, first beam of coherent radiation 110 and second beam of coherent radiation 115 are substantially collinear. It should be noted that first beam of coherent radiation 110 and second beam of coherent radiation 115 need not be mutually coherent and that the degree of coherence required is minimal, the coherence length being sufficient to produce speckle. First beam of coherent radiation 110 and second beam of coherent radiation 115 may occur sequentially, or they may be present simultaneously. Furthermore, they may be represented by the same beam containing spectral components centered at least first wavelength 112 and second wavelength 117. Additionally, first beam of coherent radiation 110 and second beam of coherent radiation 115 may be represented by the same beam having time-varying spectral components containing at least first wavelength 112 and second wavelength 117 at some point of time within its time-varying cycle. First beam of coherent radiation 110 and second beam of coherent radiation 115 may be continuous wave (CW) or pulsed. Various techniques and components can be utilized for producing first wavelength 112 and second wavelength 117 that are known to those skilled in the art, including but not limited to using tunable lasers that are tuned based on varying the drive current, operating temperature, cavity length, or external cavity configuration; discrete frequency lasers with outputs that are combined, that are individually amplitude modulated, or that can be added and dropped through optical switches such as Mach Zehnder interferometers or microelectro-mechanical system (MEMS) switches. Multiple longitudinal mode lasers that simultaneously operate at least two wavelengths can also be employed.

Object 100 can be nominally at a standoff distance R from entrance pupil 155 (of size D) of optical receiver 160. Objective 165 of optical receiver 160 can collect scattered coherent radiation from object 100 that emanated from first beam of coherent radiation 110 and/or second beam of coherent radiation 115 and can direct it towards image 170 forming defocused image 172 on detector array 175. Due to surface roughness within neighborhood 125, the scattered coherent radiation from object 100 can form a speckle pattern at entrance pupil 155. A corresponding speckle pattern can be formed within defocused image 172 on detector array 175 when the detector array is not positioned at the focal plane containing image 170. If illumination spot 150 is sufficiently localized, then the desired behavior is for the speckle pattern formed at entrance pupil 155 to be demagnified as radiation converges from entrance pupil 155 to detector array 175. The demagnification is given by $$M_D = \frac{D'}{D}, \quad (1)$$

where D' is the size of the converging beam at detector array 175. Detector array 175 can be on either side of image 170 and image 170 need not be formed. If the converging beam passes through image 170 before reaching detector array 175, then D' is negative and the speckle pattern is inverted. The speckle pattern formed at detector array 175 may be distinguished as being a first speckle pattern 180 produced by first beam of coherent radiation 110 at first wavelength 112 or a second speckle pattern 185 produced by second beam of coherent radiation 115 at second wavelength 117. First speckle pattern 180 and second speckle pattern 185 can be highly correlated due to the fact that they were formed from radiation scattered from substantially the same set of scattering cells on neighborhood 125. The dominant difference between first speckle pattern 180 and second speckle pattern 185 can be a lateral shift 190 that is related to the direction of surface normal 145.

Figure 1B:
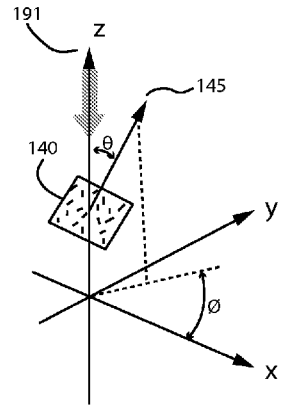
FIG. 1b depicts portions of the system of FIG. 1a in a Cartesian coordinate system.

FIG. 1b, shows tangent plane 140 in relation to a Cartesian coordinate system 191. Tangent plane 140 intersects the z-axis at location 120. Surface normal 145 is denoted in Cartesian coordinate system 191 through spherical-polar angles $(\theta,\phi)$ as $$s = i \sin\theta \cos\phi + j \sin\theta \sin\phi + k \cos\theta. \quad (2)$$

The height profile of tangent plane 140 is represented by $$z_s = z_0 + \alpha x + \beta y, \quad (3)$$

where $$\alpha = -\tan\theta \cos\phi$$

$$\beta = -\tan\theta \sin\phi \quad (4)$$

and $z_0$ is the height value of location 120. Slope parameters $\alpha$ and $\beta$ provide an additional means of quantifying slope information. In FIG. 1b, first beam of coherent radiation 110 and second beam of coherent radiation 115 can propagate nominally in the direction opposite to the z-axis of coordinate system 191.

In one embodiment, first beam of coherent radiation 110 and second beam of coherent radiation 115 can be substantially Gaussian laser beams. Other beam types, however, may also be utilized, such as those that exhibit the same general behavior as that of a Gaussian beam. The beam need not be circularly symmetric; for the purpose of illustration, however, circular symmetry is assumed. The intensity profile of a circularly symmetric Gaussian beam is expressed as $$I = I_0 \exp[-2r^2/w^2], \quad (5)$$

where w is the value of the radius r where the intensity falls to the $1/e^2$ point of its peak value $I_0$. The beam radius varies as the beam propagates according to $$w = w_0 \sqrt{1 + \zeta^2/z_r^2}, \tag{6}$$

where $w_0$ is the beam radius at the beam waist, $\zeta$ is the distance from the waist along the beam axis, and the $z_r$ is the Rayleigh range, given by $$z_r = \pi w_0^2 / 2. \tag{7}$$

Within the paraxial approximation, the beam waist radius and the Rayleigh range are related to the f/#, representing the convergence rate of the beam, by $$w_0 = \frac{2}{\pi} \lambda f/\# \tag{8}$$

and $$z_r = \frac{4}{\pi} \lambda f/\#^2. \tag{9}$$

When object 100 is illuminated with a focused Gaussian laser beam, the Rayleigh range $z_r$ and beam waist $w_0$ are measures of the depth of field and the spot size, respectively, of the laser beam on the object. As numerical examples, for a waist size of $w_0$=100 μm and a nominal illumination wavelength of λ=1550 nm, $z_r$=20.3 mm and f/#=101. Additionally, for a waist size of $w_0$=100 μm at λ=405 nm, $z_r$=77.6 mm and f/#=388. Therefore, unless $w_0$ is small, the Rayleigh range is large compared to typical surface profiles and it is not ordinarily necessary to refocus the laser beam for different locations 120 on the object.

Measurement of first speckle pattern 180 and second speckle pattern 185 can occur in any of numerous modes. In one embodiment, detector 175 is a two-dimensional detector array comprised of at least three detector elements or pixels. Detector elements need not lie on a plane. In another embodiment, detector 175 is a quad cell. In yet another embodiment, detector array 175 is a two-dimensional detector array with closely packed and contiguous pixels. In a further embodiment, detector 175 is a linear array comprised of at least two elements arranged in substantially a straight line. In one embodiment of a linear array, the array is aligned to substantially coincide with the direction of speckle shift. In another embodiment detector 175 is comprised of at least two separated detection elements or groups of detection elements. In one embodiment, a time history of speckle intensity over a multiple set of wavelengths is produced in parallel for each detector element. In a further embodiment, the set of wavelengths is produced by a continuous or stepped wavelength scan. Detector 175 can be of various other types including charge couple device (CCD), complementary metal-oxide-semiconductor (CMOS), Geiger-mode avalanche photodiode array (GmAPD), and digital focal plane array (DFPA). In one embodiment, a bandpass filter can be utilized with detector 175 so that the filter substantially passes first wavelength 112 and second wavelength 117 but substantially blocks radiation falling outside of a wavelength band containing first wavelength 112 and second wavelength 117. In one embodiment a DFPA performs calculations at chip on the pixel level.

Figure 1C:
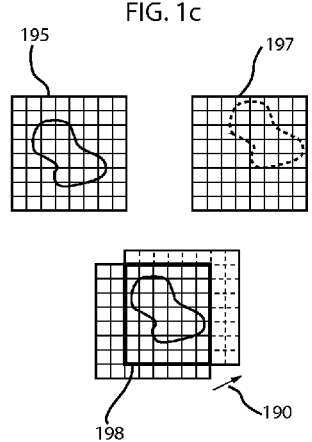

FIG. 1c shows a first digital representation $I_1(i, j)$ 195 of first speckle 180 and a second digital representation $I_2(i, j)$ 197 of second speckle pattern 185 as obtained when detector array 175 is a two-dimensional grid of closely spaced pixels.

Overlap region 198 between first digital representation 195 and second digital representation 197 is obtained by applying pixel shift $(\Delta i, \Delta j)$ between these two digital representations. The optimal value of $(\Delta i, \Delta j)$ is determined by minimizing a measure of the magnitude of the difference map over overlap region 198. One such measure is $$F(\Delta i, \Delta j) = \sum_{i=max(1,1-\Delta i), j=max(1,1-\Delta j)}^{min(N_i, N_i-\Delta i), min(N_j, N_j-\Delta j)} |I_1(i, j) - AI_2(i - \Delta i, j - \Delta j)|^p, \tag{10}$$

where A is a scale adjustment to account for any difference in the magnitude of the signal levels for the two speckle patterns, p typically takes the value of 1 or 2, and $N_i$ and $N_j$ represent the number of pixels along the i and j dimensions of the digital representations. Enhanced precision is achievable through sub-pixel interpolation methods.

Determining the optimal value of shift 190 can be accomplished through use of a number of different algorithms, including those known by one of ordinary skill in the art. For example, shift 190 can be obtained through calculating a cross correlation of first digital representation 195 and second digital representation 197. The location of the peak of the cross correlation provides shift 190 when pixel spacing is used to convert to units of distance. Again, enhanced precision can be achieved through sub-pixel interpolation algorithms. Another example of a method for determining shift 190 is to utilize optical flow algorithms known to those skilled in the art. Yet another method for determining speckle shift is to compare the speckle intensity time histories produced by a sequence of measurements at different wavelengths and to determine the time delay for features in the speckle pattern to move between detector elements. In one embodiment the determination of shift is performed by a processor in communication with a memory and containing machine instructions capable of determining a shift.

In units of length, we can define speckle shift s as the speckle shift that occurs at entrance pupil 155 and s' as the speckle shift that occurs at detector array 175. These quantities are substantially related by $$s' = M_D s. \tag{11}$$

Speckle shift s has components $s_x$ and $s_y$ and speckle shift s' has components $s'_x$ and $s'_y$ in coordinate system 191.

For a small change $\Delta v$ in optical frequency v or a corresponding small change $\Delta \lambda$ in wavelength λ, the surface slope α along the x direction and the surface slope β along the y direction of tangent plane 140 are substantially related to the components of shift 190 at detector array 175 through $$\alpha = -\frac{v}{\Delta v} \frac{s'_x}{2RM_D} \approx \frac{\lambda}{\Delta \lambda} \frac{s'_x}{2RM_D} \tag{12}$$

$$\beta = -\frac{v}{\Delta v} \frac{s'_y}{2RM_D} \approx \frac{\lambda}{\Delta \lambda} \frac{s'_y}{2RM_D}.$$

In terms of the magnitude of the speckle shift at detector array 175

$$s' = \sqrt{s'^2_x + s'^2_y}, \tag{13}$$

the angle of incidence $\theta$ is $$\theta = \tan^{-1}\left(-\frac{v}{\Delta v}\frac{s'}{2RM_D}\right) \approx \tan^{-1}\left(\frac{\lambda}{\Delta \lambda}\frac{s'}{2RM_D}\right), \quad (14)$$

and the azimuth angle $\phi$ of surface normal 145 is $$\phi = \tan^{-1}(s'_y/s'_x). \quad (15)$$

The wavelength change $\Delta\lambda$ is a parameter that can be chosen to best suit a given application. As a practical matter, it is convenient to specify $\Delta\lambda$ in terms of the ratio $\gamma$ of the speckle shift s' to a representative speckle lobe size $d'_s$ at the detector, or equivalently in terms of the ratio of speckle shift s to a representative speckle lobe size $d_s$ at the entrance pupil:

$$\gamma = \frac{s'}{d'_s} = \frac{s}{d_s} = \frac{s'w}{\lambda RM_D}, \quad (16)$$

where w represents the illumination beam size at the object. Thus $\gamma$ is a measure of the fractional speckle shift in terms of units of speckle lobe size. The magnitude of the change $\Delta\lambda$ in wavelength required to produce a given value of fractional speckle shift $\gamma$ is $$\Delta\lambda = \frac{\gamma\lambda^2}{2w\tan\theta}, \quad (17)$$

and the corresponding change in frequency is $$\Delta v = \frac{\gamma c}{2w\tan\theta}, \quad (18)$$

where c is the speed of light. Note that $\Delta v$ is independent of wavelength and depends only on the range extent of the illuminated region of tangent plane 140, whereas $\Delta\lambda$ goes as the square of the wavelength $\lambda$.

When measurements are performed at long ranges, it may be desirable in order to reduce system size, to limit the size D of entrance pupil 155 to approximately the same size as the output optic that produces first beam of coherent radiation 110 and second beam of coherent radiation 115. Indeed, entrance pupil 155 may also be used to produce beams 110 and 115 in a monostatic system configuration, to be further described. Consequently, for this compact configuration there may be approximately only one speckle lobe falling within the entrance pupil. Thus, for this situation, the fractional speckle shift $\gamma$ should be less than unity so that first speckle pattern 180 and second speckle pattern 185 produce a substantial overlap region 198 for accurately determining shift 190.

Equations 17 and 18 provide a means for determining the wavelength change $\Delta\lambda$ and the equivalent frequency change $\Delta v$ to use for a particular application. For instance, when $\gamma=0.2$, $\theta=45°$, and w=100 μm the required frequency change is $\Delta v=300$ GHz. At the additional illumination spot sizes of w=1 mm and w=10 mm the frequency change reduces to $\Delta v=30$ GHz and $\Delta v=3$ GHz, respectively. For w=100 μm and nominal laser wavelengths of 1550 nm and 405 nm, the corresponding wavelength shifts are respectively $\Delta\lambda=2.4$ nm and $\Delta\lambda=0.16$ nm.

In FIG. 1a, beam scanning 199 can be employed to move first beam of coherent radiation 110 and second beam of coherent radiation 115 relative to object 100 so that slope information can be obtained for additional locations 120 on surface profile 105 of object 100. Various techniques and components can be used for beam scanning 199, including those known to one of ordinary skill in the art. These can include, for example, moving the object in a raster-scan pattern relative to beams 110 and 115 or angularly steering beams 110 and 115. Examples of beam steering approaches include but are not limited to galvanometers, fast steering minors, multifaceted spinning minors, micro-electro-mechanical system (MEMS) minors, and acousto-optic beam deflectors, and Risley prisms.

Figure 2A:
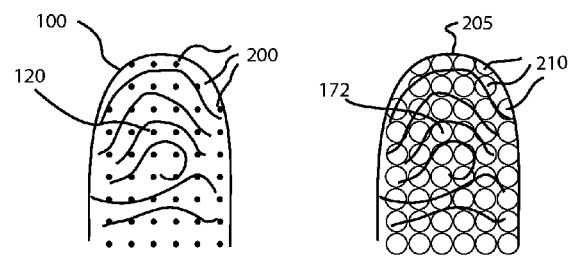
FIG. 2a depicts an illustrative embodiment of an illumination pattern and a defocused image.

In many applications it is highly desirable to minimize the data acquisition time required to cover multiple locations 120. In reference to FIG. 2a, acquisition time is reduced by illuminating object 100 with an illumination spot array 200 that simultaneously illuminates multiple locations 120 on object 100. Each individual spot in illumination spot array 200 is comprised of a first coherent beam of radiation 110 and a second coherent beam of radiation 115. As previously described, first wavelength 112 and second wavelength 117 may be present simultaneously or sequentially. Although illumination spot array 200 is illustrated in this embodiment as a two-dimensional array on a square grid, the array need not be two-dimensional and/or the spots need not be on a square or a regular grid. For example, the array can be a linear one-dimensional array or a two-dimensional array with different spacings in orthogonal directions. Extended defocused image 205 can consist of an array 210 of defocused images 172 corresponding to spot array 200. In one embodiment, the degree of defocus producing array of defocused images 210 is not so great as to cause a substantial overlap between adjacent defocused images 172 in array of defocused images 210. Shift 190 can be determined for first speckle pattern 180 and second speckle pattern 185 corresponding to each location 120 in spot array 200 and slope information can be calculated for each location 120 corresponding to spot array 200. Thus, acquisition speed can be enhanced by acquiring slope information at multiple locations on object 100 in parallel.

Figure 2B:
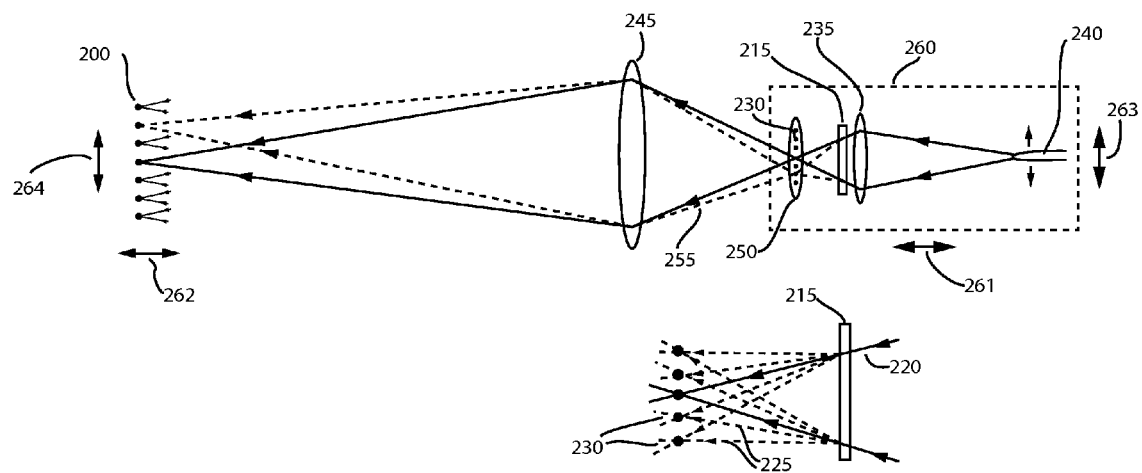
FIG. 2b depicts an illustrative embodiment of another system for performing imaging of an object.

One embodiment for producing illumination spot array 200 is to use a beam replicating element that replicates first beam of coherent radiation 110 and second beam of coherent radiation 115 at an array of locations. In reference to FIG. 2b, the beam replicating element is a diffractive optical element beam splitter 215 that replicates incident beam 220 into multiple directions 225. If incident beam 220 is a converging beam, then multiple directions 225 can form multiple focused spots 230. If incident beam 220 is collimated, then multiple directions 225 can form multiple collimated beams propagating in different directions. In one embodiment, lateral translation of individual spots in illumination spot array 200 that is caused by the wavelength dependence of diffractive optical element beam splitter 215 can be compensated for by designing the combination of optical elements in the optical train producing illumination spot array 200 to be substantially independent of wavelength at first wavelength 112 and second wavelength 117.

In one embodiment, incident beam 220 can be formed by producing a converging beam using a focusing lens 235 (whenever a lens is referred to herein, it may be substituted by a curved mirror or another component that functions similar thereto). In one embodiment, the beam entering lens 235 can be produced by light expanding from the tip of an optical fiber 240. Multiple focused spots 230 can be imaged by output optic 245 to form illumination spot array 200 on object 100. Field lens 250 can serve to redirect diverging beams 255 such that they are centered on output optic 245. In this manner, beam walk-off of diverging beams 255 can be avoided. Field lens 250 can be placed at or near the position of multiple focused spots 230 and its focal length is substantially such that diffractive element beam splitter 215 is imaged onto output lens 245.

Figure 2C:
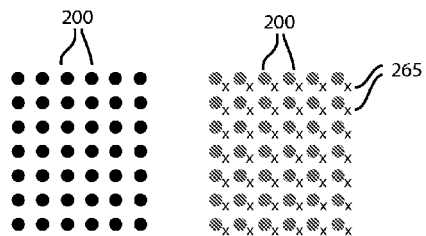
FIG. 2c depicts an illumination array and a translated array obtained using the system of FIG. 2b.

In one embodiment, spot-replicating assembly 260 can be moved relative to output optic 245. Longitudinal translation 261 of spot-replicating assembly 260 can cause focal position 262 of illumination spot array 200 to vary, allowing spot assembly 200 to be focused on or near object 100. It is not necessary for illumination spot array 200 to be focused on object 100. Focusing, however, can allow spatial-resolution limit 135 to be reduced so that higher resolution slope information about surface profile 105 can be obtained. Lateral translation 263 of spot-replicating assembly 260 can cause lateral translation 264 of illumination spot array 200 and can form translated spot array 265 shown in FIG. 2c. Lateral translation 264 can allow additional slope information to be acquired on surface profile 105 of object 100 at locations 120 that fall within the gaps in prior measurements.

FIG. 3 describes a method for determining slope information at least one location 120 on surface profile 105 of object 100. The method of FIG. 3 can be performed utilizing more or less than the steps described herein and can be performed utilizing various components, including components described with respect to FIGS. 1a and 2b. In step 300, object 100 can be acquired in the field of view and within the depth of field of the measurement system. Step 300 may include pointing the measurement system, selecting a region of interest in the field of view, adjusting the field of view using elements within or auxiliary to the measurement system, focusing the measurement system, moving the object, waiting for the object to fall within the field of view and the depth of field of the measurement system, and/or any other means of satisfying field-of-view and depth-of-field requirements.

In one embodiment, feedback can be used based on the size of speckle produced at detector array 175 to adjust the focal position of illumination spot 150 or illumination spot array 200 on object 100. Focus can be achieved when the speckle size is maximized. In another embodiment, sideways translation of illumination spot 150 or illumination spot array 200 relative to object 100 can be produced by lateral translation 263 and the direction and magnitude of the resulting speckle motion at detector 175 can be utilized as feedback to adjust the focal position of illumination spot 150 or illumination spot array 200 on object 100. The rate of speckle motion caused by lateral motion 263 can be minimized when focus is achieved. Furthermore, the sign of the direction of translation flips depending on whether object 100 is in front of or behind illumination spot 150 or illumination spot array 200, allowing for a feedback loop to be established that does not have a sign ambiguity.

In one embodiment, a camera can be boresighted with the optical system to provide a view of the object or the object and its surroundings. The image from the boresighted camera may be utilized for pointing, tracking, image registration, and/or focusing. In one embodiment the camera can utilize ambient light at wavelengths other than first wavelength 112 and second wavelength 117. In a further embodiment, the boresighted camera can utilize a dichroic filter to direct wavelengths other than first wavelength 112 and second wavelength 117 to the boresighted camera. Step 300 may further include tracking object 100 as it moves to reduce errors in slope information caused by relative motion. Step 300 may also include registering illumination spot array 200 with translated spot array 265 so that slope information can be combined to form a higher density slope information map.

In step 310, at least one location 120 can be illuminated with first beam of coherent radiation 110 at first wavelength 112 and with second beam of coherent radiation 115 at second wavelength 117. In step 320, defocused image 172 can be formed for first wavelength 112 and for second wavelength 117 for at least one location 120. In step 330, shift 190 between first speckle pattern 180 at first wavelength 112 and second speckle pattern 185 at second wavelength 117 can be determined for at least one location 120. In step 340, slope information can be calculated for at least one location 120.

Figure 4A:
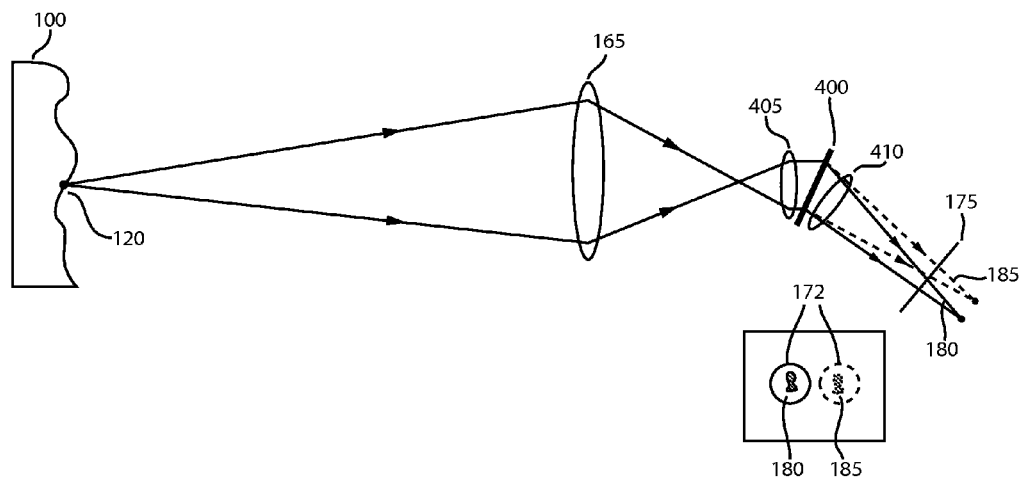
FIG. 4a depicts an illustrative embodiment of another system for performing imaging of an object.

Step 310 can be carried out with first wavelength 112 and second wavelength 117 occurring either simultaneously or sequentially. FIG. 4a illustrates a system whereby the first and second wavelengths occur simultaneously and where first speckle pattern 180 and second speckle pattern 185 are spatially separated at detector 175 using dispersive element 400. In one embodiment, scattered radiation from location 120 can be collected by objective 165 and substantially collimated by collimating lens 405. Dispersive element 400 angularly disperses spectral components at first wavelength 112 and second wavelength 117 such that converging lens 410 produces defocused images 172 for first speckle pattern 180 and for second speckle pattern 185 that do not overlap or substantially overlap at detector array 175. Dispersive element 400 may be a diffraction grating, a prism, or any element that directs spectral components into different directions.

For the purpose of illustration in FIG. 4a, dispersive element 400 can be a transmissive diffraction grating operating in the Litrow configuration. A reflective diffraction grating may also be used. Furthermore, the exemplary embodiments do not need to operate in the Litrow configuration. If dispersive element 400 is a diffraction grating, it is preferably optimized to have high diffraction efficiency for the diffraction order that is being utilized. A diffraction grating is preferred because very high dispersion is achievable, allowing for first speckle pattern 180 and second speckle pattern 185 to become spatially separated over a relatively short propagation path.

For a diffraction grating operating in the Litrow configuration, the angular dispersion is given by $$\frac{\Delta \theta_d}{\Delta \lambda} = \frac{1}{\sqrt{\frac{1}{f_d^2} - \frac{\lambda^2}{4}}}, \qquad (19)$$

where $f_d$ is the spatial frequency of the diffraction grating and $\Delta \theta_d$ is the change in direction of the diffraction angle corresponding to the wavelength change $\Delta \lambda$. For $\lambda$=1550 nm and $f_d$=940 lines per mm, the dispersion is $\Delta \theta_d/\Delta \lambda$=1.4 mrad/nm. Likewise, for $\lambda$=405 nm and $f_d$=1800 lines per mm, the dispersion is $\Delta \theta_d/\Delta \lambda$=1.8 mrad/nm. Thus, for $\lambda$=1550 nm and $\Delta \lambda$=2.4 nm, a separation of 500 μm can be achieved over a path length of 150 mm. For $\lambda$=405 nm and $\Delta \lambda$=0.16 nm, a separation of 200 μm can be achieved over a path length of 690 mm. These separations are sufficient to adequately sample first speckle pattern 180 and second speckle pattern 185 at pixel sizes that are readily available for detectors operating at these illustrative wavelengths.

Figure 4B:
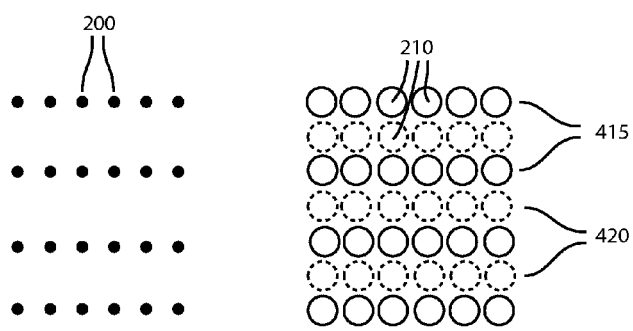

In FIG. 4b illumination spot array 200 has extra space between rows so that first array of defocused images 415 produced by first wavelength 112 and second array of defocused images 420 produced by second wavelength 117 are interleaved on detector 175 by dispersive element 400 without there being an overlap or a substantial overlap between first array of defocused images 415 and second array of defocused images 420. The lateral offset between the centers of first speckle pattern 180 and second speckle pattern 185 on detector 175 is taken into account when determining shift 190.

Figure 4C:
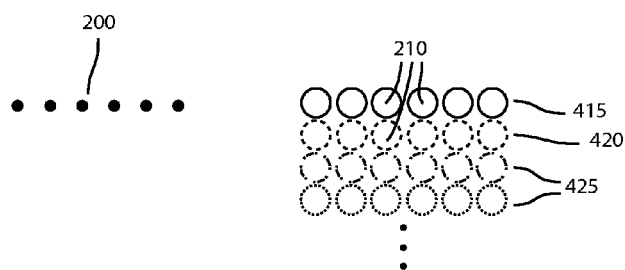

In one embodiment, a multiple set of discrete wavelengths can occur simultaneously. In a further embodiment, the multiple set of discrete wavelengths can be produced by a laser operating with multiple longitudinal modes that are evenly spaced in frequency. In FIG. 4c, dispersive element 400 can separate out the set of discrete wavelengths comprising illumination spot array 200 into individual rows that do not substantially overlap. In one embodiment, spot array 200 can be a single row as shown in FIG. 4c. In another embodiment, spot array 200 can contain more than one row and these rows can be sufficiently separated so that at least a first wavelength 112 and a second wavelength 117 do not overlap or substantially overlap with other defocused images 425 from other wavelengths in the discrete set of wavelengths.

Figure 5A:
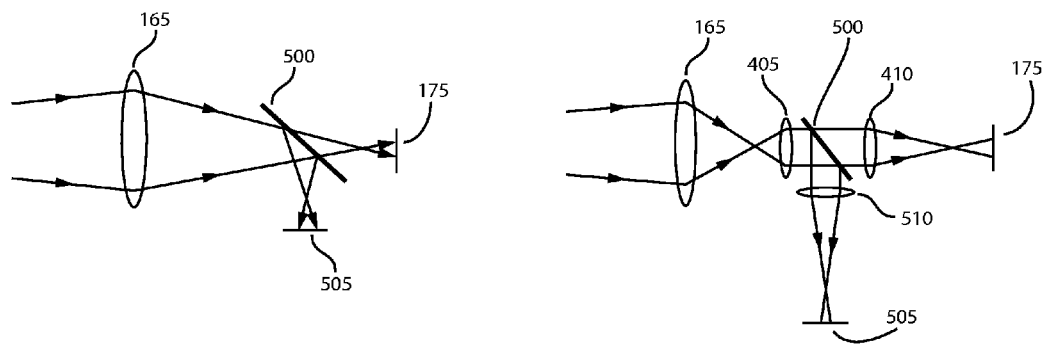
FIG. 5a depicts an illustrative embodiment of another system for performing imaging of an object.
Figure 5B:
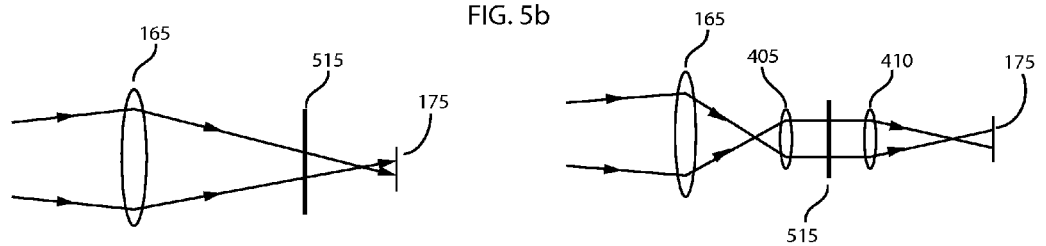
FIG. 5b depicts an illustrative embodiment of another system for performing imaging of an object.
Figure 5C:
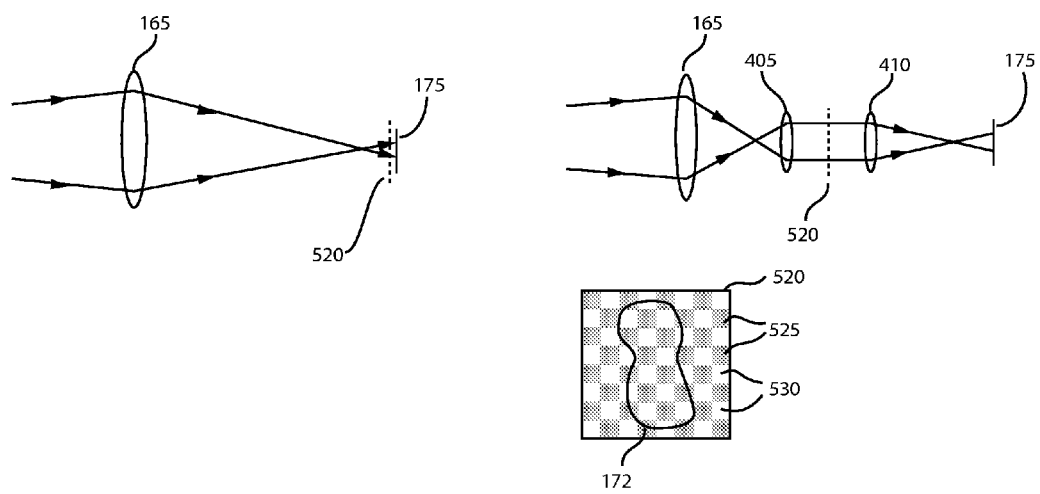
FIG. 5c depicts an illustrative embodiment of another system for performing imaging of an object and a patterned array of wavelength selective elements.

FIGS. 5a-5c illustrate systems for separating first speckle pattern 180 and second speckle pattern 185 when first wavelength 112 and second wavelength 117 occur simultaneously. In reference to FIG. 5a, wavelength-selective element 500 can transmit first wavelength 112 to form first speckle pattern 180 on detector array 175 and reflect second wavelength 117 to form second speckle pattern 185 on second detector array 505. In one embodiment, collimating lens 405 can substantially collimate radiation being scattered from illumination spot 150 before reaching wavelength-selective element 500. First converging lens 410 can form first speckle pattern 180 on first detector array 175 and second converging lens 510 can form second speckle pattern 185 on second detector array 505. Substantially collimating radiation reaching wavelength-selective element 500 can reduce the requirements on wavelength-selective element 500. In one embodiment, wavelength-selective element 500 can be a dichroic filter. In another embodiment, wavelength-selective element 500 can be an etalon.

In reference to FIG. 5b, time-varying wavelength-selective element 515 can substantially transmit first wavelength 112 and substantially block second wavelength 117 at a first time and can substantially transmit second wavelength 117 and substantially block first wavelength 112 at a second time. In this manner first speckle pattern 180 can be present on detector 175 at the first time and second speckle pattern 185 can be present on detector 175 at the second time. In one embodiment, collimating lens 405 can substantially collimate radiation being scattered from illumination spot 150 before reaching time-varying wavelength-selective element 515. Converging lens 410 can form first speckle pattern 180 on detector array 175 at the first time and second speckle pattern 185 on detector array 175 at the second time. Substantially collimating radiation reaching time-varying wavelength-selective element 515 can reduce the requirements on time-varying wavelength-selective element 515. In one embodiment, wavelength-selective element 515 can be a tunable etalon.

In reference to FIG. 5c, patterned array of wavelength selective elements 520 can substantially pass first wavelength 112 while substantially blocking second wavelength 117 at first set of positions 525 and can substantially pass second wavelength 117 while substantially blocking first wavelength 112 at second set of positions 530. In this manner, first speckle pattern 180 can be sampled at first set of positions 525 on detector array 175 and second speckle pattern 185 can be sampled at second set of positions 530 on detector array 175. In one embodiment, collimating lens 405 can substantially collimate radiation being scattered from illumination spot 150 before reaching patterned array of wavelength selective elements 520. Converging lens 410 can form first speckle pattern 180 on detector array 175 at sample positions on detector array 175 corresponding to first set of positions 525 and can form second speckle pattern 180 on detector array 175 at sample positions on detector array 175 corresponding to second set of positions 530. Substantially collimating radiation reaching patterned wavelength-selective element 520 can reduce the requirements on patterned wavelength-selective element 520. In one embodiment, patterned wavelength-selective element 520 can be a checkerboard array of interference filters overlaying pixels of detector array 175. Although FIGS. 5a-5c illustrate only rays and defocused image areas corresponding to a single illumination spot 150, it should be understood that the exemplary embodiments include the general case of utilizing illumination spot array 200.

Figure 6A:
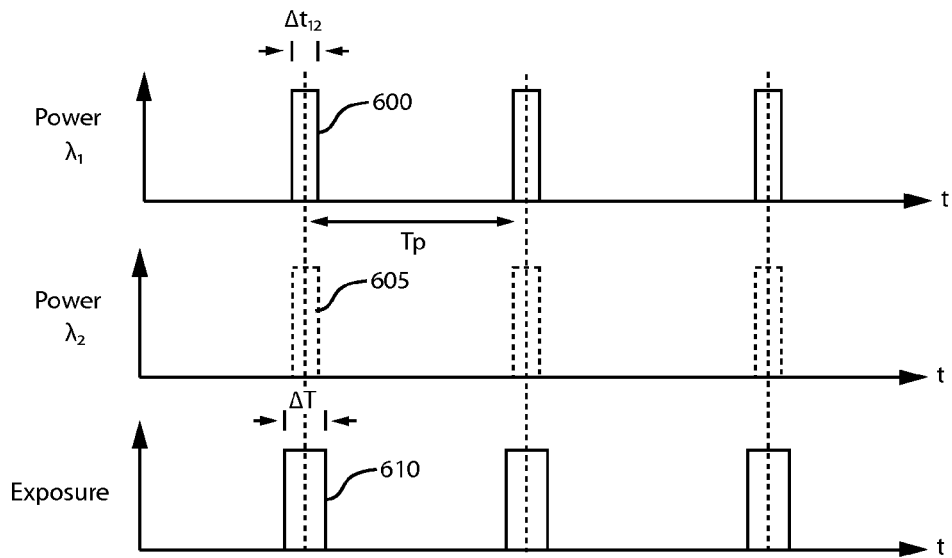
FIG. 6a depicts an illustrative embodiment of timing diagram utilizing pulsed beams of coherent radiation.

FIG. 6 illustrates timing diagrams for one or more exemplary embodiments where the first beam of coherent radiation 110 and the second beam of coherent radiation 115 can be pulsed rather than CW. Although pulsing is not necessary, pulsing does provide the capability of reducing deleterious effects of relative motion that may occur between the measurement apparatus and the object during a measurement. In reference to FIG. 6a, first pulse 600 at first wavelength 112 and second pulse 605 at second wavelength 117 can occur simultaneously. Relative motion between the measurement apparatus and the object during the pulse time $\Delta t_{12}$ may blur first speckle pattern 180 and second speckle pattern 185, reducing the accuracy to which shift 190 can be determined. The error associated with speckle blurring may be mitigated by using a pulse duration $\Delta t_{12}$ that is short enough to substantially freeze speckle motion due to relative motion. Preferably, exposure period 610 of detector array 175, shown as having duration $\Delta T$, can be timed to receive first speckle pattern 180 produced by first pulse 600 and second speckle pattern 185 produced by second pulse 605 while not receiving extraneous background light. Background light may also be reduced with a bandpass filter placed in the optical train before detector array 175 to substantially block radiation, such as solar radiation, that occurs outside the wavelength band containing first wavelength 112 and second wavelength 117. In one embodiment, first pulse 600, second pulse 605, and exposure period 610 are repeated periodically as illustrated with repetition period $T_p$. In one embodiment, repeated pulses are used for averaging. In a further embodiment, repeated pulses are used to acquire slope information at additional locations on object 100.

Figure 6B:
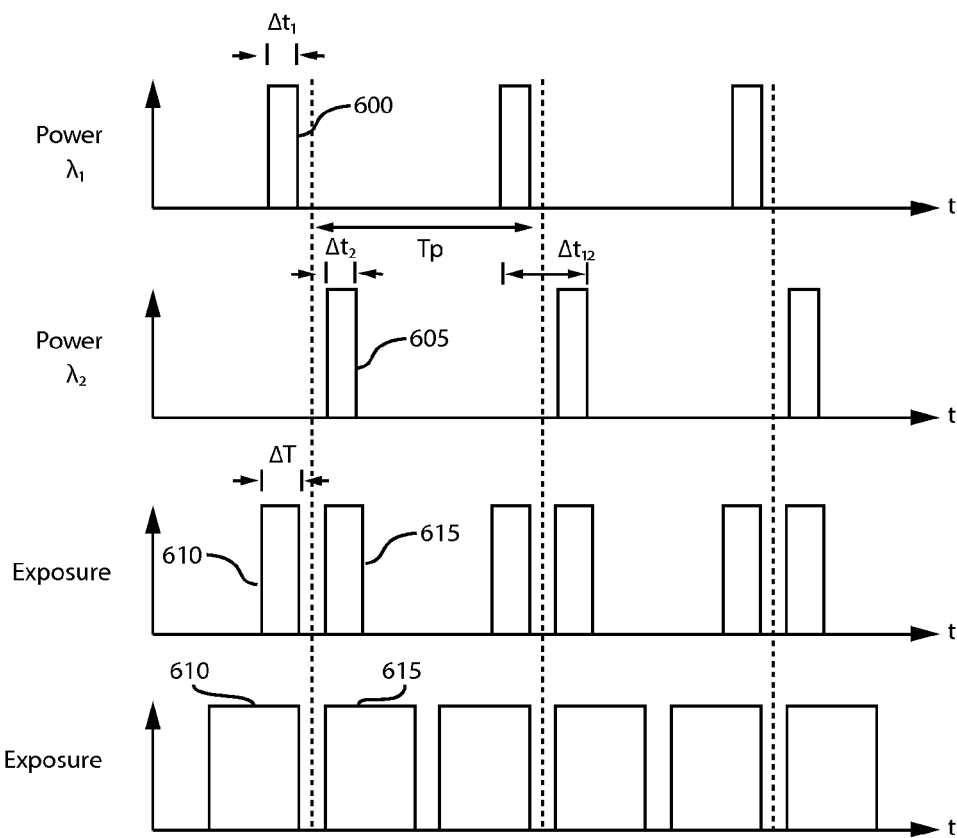
FIG. 6b depicts an illustrative embodiment of timing diagram utilizing sequential beams of coherent radiation.

In reference to FIG. 6b, first wavelength 112 and second wavelength 117 can occur sequentially. Here, relative motion between the measurement apparatus and the object that occurs between first pulse 600 and second pulse 605 may produce a contribution to shift 190 between first speckle pattern 180 and second speckle pattern 185 that is not related to surface slope. This erroneous contribution may be mitigated by positioning first pulse 600 associated with first wavelength 112 and second pulse 605 associated with second wavelength 117 such that these pulses are close together in time and the total duration $\Delta t_{12}$ of the combined pulses is minimized. First exposure period 610 can be timed to receive first speckle pattern 180 and to block second speckle pattern 185, while second exposure period 615 can be timed to receive second speckle pattern 185 and to block first speckle pattern 180. In one embodiment, first pulse 600, first exposure period 610, second pulse 605, and second exposure period 615 can be repeated periodically as illustrated with repetition period $T_p$. In one embodiment, first exposure period 610 can begin shortly before first pulse 600 and second exposure period 615 ends shortly after second pulse 605 in order to minimize the detection of background radiation. In another embodiment, the dead time between first exposure period 610 and second exposure period 615 and between second exposure period 615 and first exposure period 610 can be equal, as shown in the bottom timing diagram of FIG. 6b, in order to simplify detector framing requirements.

Both relative rotational motion and relative translational motion between the measurement apparatus and the object can be considered when estimating acceptable limits for $\Delta t_{12}$. Let $\gamma_r$ represent the fractional speckle shift that arises from relative rotation between the measurement apparatus and the object due to a relative angular rotation rate $\omega$. Then the maximum time $\Delta t_{12}$ that can be allowed and still keep $\gamma_r$ under a given value is approximately $$\Delta t_{12} \approx \frac{\lambda \gamma_r}{2\omega w}. \tag{20}$$

As illustrative examples, for w=100 μm, ω=10°/s, and $\gamma_r$=0.01, the maximum allowable time is $\Delta t_{12}$=440 μs when λ=1550 nm and $\Delta t_{12}$=120 μs when λ=405 nm.

The effects of relative motion comprised of a lateral translation between the measurement apparatus and the object is treated in detail in U.S. Patent Publication No. 2011/0013198A1 entitled "DIMENSIONAL PROBE AND METHODS OF USE" which is herein incorporated by reference in its entirety. The speckle shift resulting from a relative lateral translation is a function of the distance ζ the surface element from the beam waist and switches sign depending on the sign of ζ. If ζ lies within the Rayleigh range then we can set an approximate time limit according to $$\Delta t_{12} \approx \pi \sqrt{2} \frac{w_0 \gamma_t}{v_t}, \tag{21}$$

where $v_t$ is the lateral rate of relative translation and $\gamma_t$ is the magnitude of the corresponding fractional speckle shift. For $w_0$=100 μm, $v_t$=10 mm/s, and γ=0.01, the maximum allowable time is $\Delta t_{12}$=440 μs, independent of wavelength.

FIGS. 7a-7c illustrate graphical representations associated with methods of correcting for relative motion between the object and the measurement system that may produce erroneous contributions to shift 190 that are not related to surface slope. FIGS. 7a-7c are also associated with methods for utilizing measurements at wavelengths in addition to first wavelength 112 and second wavelength 117 to improve estimates of slope information. In reference to FIG. 7a, first wavelength 112 occurs at time $t_a$, second wavelength 117 occurs at time $t_b$, and first wavelength 112 is repeated at time $t_c$ to produce a third speckle pattern. Corrupted shift 700 is the shift between first speckle pattern 180 and second speckle pattern 185 that has been perturbed due to relative motion that occurs between times $t_a$ and $t_b$. Motion-indicator shift 705 is the shift between first speckle pattern 180 and the third speckle pattern that is caused by relative motion only. If relative motion is approximately uniform over the time period between $t_a$ and $t_c$, then compensation shift 710 can be determined by changing the sign of the direction of indicator shift 705 and prorating it by the factor $(t_b - t_a)/(t_c - t_a)$. Corrected shift 715 is obtained by adding compensation shift 710 to corrupted shift 700, thus producing an improved estimate of shift 190 and leading to a more accurate estimate of slope information.

In FIG. 7b, illumination at first wavelength 112 and second wavelength 117 can be generalized to illumination with a time-varying wavelength scan 720. In one embodiment, time-varying wavelength scan 720 can be a continuous wavelength scan. In another embodiment, time-varying wavelength scan 720 can be a stepped scan. In a further embodiment, time-varying wavelength scan 720 can follow a repetitive pattern. Time-varying wavelength scan 720 can produce time-varying shift 725. In one embodiment, time-varying shift 725 can be determined relative to a base speckle pattern at a base wavelength occurring at a base time. In FIG. 7b, the base time is illustrated as $t_a$ and points a through h represent the time-varying shift 725 at corresponding times $t_a$ through $t_h$ with respect to first speckle pattern 180 occurring at $t_a$. In another embodiment, time-varying shift 725 can be determined for relative shifts between speckle patterns for a given wavelength offset, e.g., shifts corresponding to times $t_a$ to $t_b$ and $t_b$ to $t_c$. Utilizing additional speckle measurements from time-varying wavelength scan 720 beyond those for first wavelength 112 and second wavelength 117 may provide for higher precision estimates of slope and may increase dynamic range. In one embodiment, dynamic range can be increased by utilizing those wavelength offsets available from time-varying wavelength scan 720 that are best suited for a given value of θ. As in FIG. 7a, time-varying wavelength scan 720 in FIG. 7b provides a means of compensating for errors in slope information due to relative motion. Motion-indicator shift 705 is inverted and prorated to form compensation shift 710. Corrected shift 715 can be obtained by adding compensation shift 710 to corrupted shift 700, thus producing an improved estimate of shift 190 and leading to a more accurate estimate of slope information.

FIG. 7c represents a further embodiment of time-varying wavelength scan 715 comprised of a rapidly repeating up-down chirp. Once again, motion compensation can be achieved by inverting and prorating motion-indicator shift 705 to form compensation shift 710 and calculating corrected shift 715 by adding compensation shift 710 to corrupted shift 700.

U.S. Patent Publication No. US20080154524A1 entitled "METHOD AND APPARATUS FOR REMOTE SENSING OF OBJECTS UTILIZING RADIATION SPECKLE" which is herein incorporated by reference in its entirety, describes using a Geiger-mode avalanche photodiode array where photon-arrival time is available at each pixel to acquire speckle patterns for rapidly repeating time-varying wavelength scans. Photon arrival times map to the wavelength of time-varying wavelength scan 720 so that it is not necessary to readout the array at high frame rates. Speckle motion is also available with high time resolution so that contributions to shift 190 that are not related to surface slope can be compensated.

In one embodiment, the effects of motion errors can be compensated for using the fact that relative rotational motion produces a speckle shift that is substantially uniform for each location on illumination spot array 200. This uniform shift can be estimated and subtracted to produce an improved estimate of shift 190 for each location. In one embodiment, the uniform shift error can be estimated using a model of what the mean shift should be for a given situation.

Figure 8:
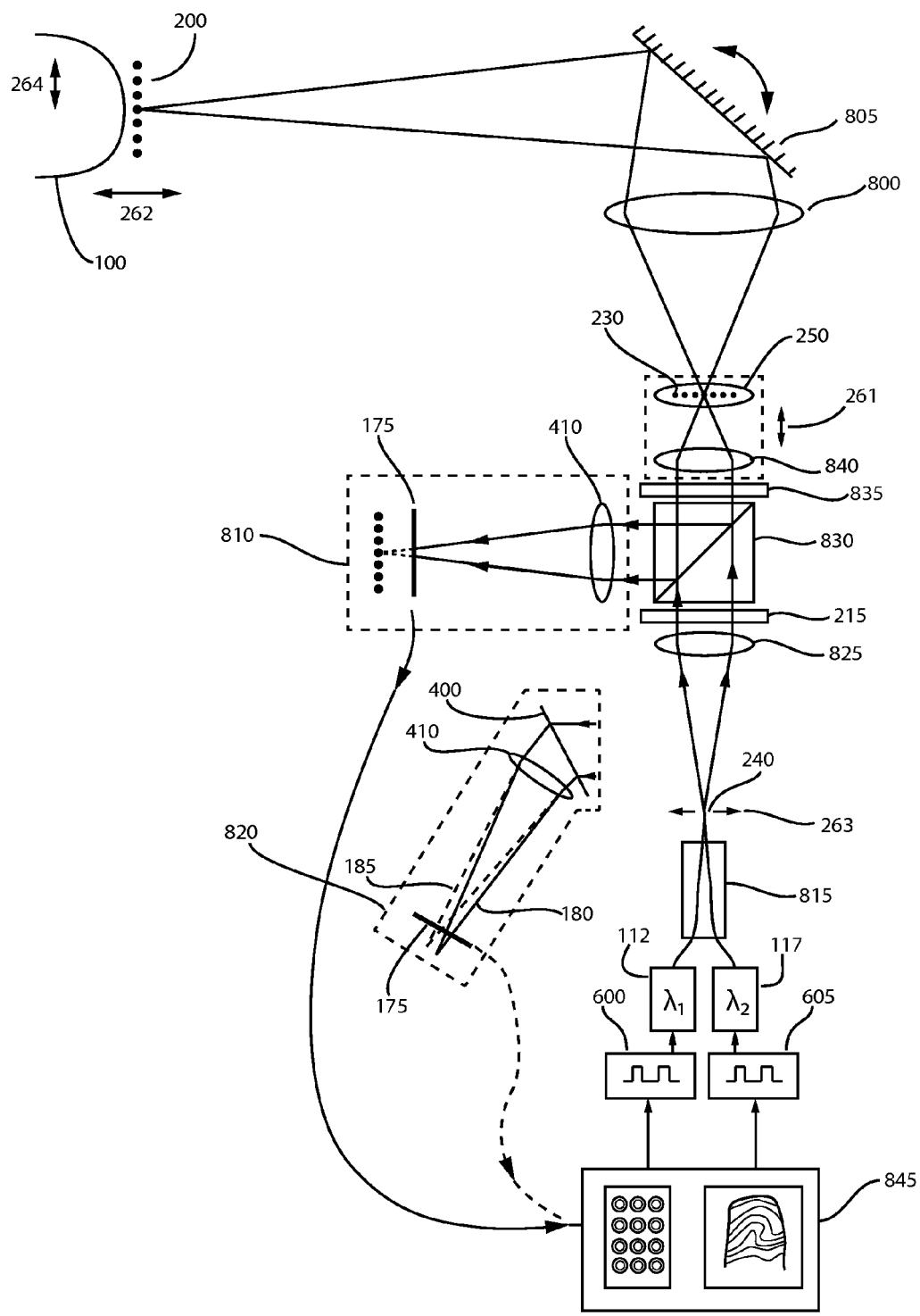
FIG. 8 depicts an illustrative embodiment of another system for performing imaging of an object.

FIG. 8 describes two preferred embodiments of a system for determining surface slope information on object 100 that incorporate previously described elements into a monostatic system. Monostatic optic 800 can serve both as output optic 245 for producing illumination spot array 200 and as objective 165 for receiving radiation scattered from the surface of object 100. As previously noted, all lenses may be replaced by the equivalent configuration using minors or other similarly functioning devices. Because monostatic optic 800 is typically the largest non-planar optic in the system, it may be preferable to replace it with a mirror when the system requires a large optic to generate a small illumination spot 150 at a long standoff distance R. Beam deflecting element 805 serves to select the field of view of the measurement system. The two preferred embodiments in FIG. 8 are distinguished by whether first speckle pattern 180 is separated from second speckle pattern 185 through time multiplexing or through wavelength multiplexing.

In a first preferred embodiment, time-multiplexing receiver assembly 810 separates speckle pattern 180 from speckle pattern 185 by timing the exposure period of detector array 175 to alternately receive radiation from first pulse 600 and second pulse 605, which pulses occur sequentially as described in FIG. 6b. In one embodiment, first pulse 600 and second pulse 605 are produced by amplitude modulating a first laser operating at first wavelength 112 and a second laser operating at wavelength 117 such that first wavelength 112 and second wavelength 117 do not occur simultaneously. Output from the amplitude modulated lasers can be combined through fiber coupler 815 and exits through optical fiber 240.

In a second preferred embodiment, wavelength-multiplexing receiver assembly 820 can separate first speckle pattern 180 from second speckle pattern 185 through dispersive element 400 as described in FIG. 4. In one embodiment, first pulse 600 and second pulse 605 can be produced by amplitude modulating a first laser operating at first wavelength 112 and a second laser operating at wavelength 117 such that first wavelength 112 and second wavelength 117 occur simultaneously. Output from the amplitude modulated lasers can be combined through fiber coupler 815 and exits through optical fiber 240.

For either the time-multiplexed embodiment or the wavelength-multiplexed embodiment described in FIG. 8, radiation exiting optical fiber 240 can be substantially collimated by collimating lens 825 and can pass through diffractive optical element beam splitter 215 to produce a diffracted array of collimated beams. Radiation that enters polarizing beam splitter 830 can be linearly polarized such that it passes through substantially unattenuated. In one embodiment, optical fiber 240 can be a polarization maintaining fiber. Quarter-wave plate 835 can be oriented such that it converts linearly polarized light exiting polarization beam splitter 830 to circularly polarized light. Focusing/collimating lens 840 can focus radiation exiting quarter-wave plate 835 to form multiple focused spots 230 at or near field lens 250. Radiation can be transmitted to and received from object 100 through monostatic optic 800. The handedness of circularly polarized light scattered from object 100 is reversed upon reflection such that quarter-wave plate 835 substantially converts the returning light to linear polarized light that is substantially reflected by polarizing beam splitter 830 into either time-multiplexing receiver assembly 810 or wavelength-multiplexing receiver assembly 820.

Digital computer 845 is in communication with detector array 175 and can determine shift 190 for each location 120 on object 100 illuminated by illumination spot array 200. In one embodiment, shift information can be further processed into slope information. In one embodiment, digital computer 845 can control the timing of first pulse 600 and second pulse 605. In one embodiment, digital computer 845 can control at least lateral motion 263 to produce translated spot array 265, longitudinal motion 261 to vary focal position 262, or beam-deflecting element 805 to vary the field of view of the optical system. In one embodiment, translated spot array 265 can be used to fill in gaps in measurement locations to produce a higher resolution map of surface information on object 100.

In one embodiment, beam-deflecting element 805 can be used to track motion of object 100. In one embodiment, a bore-sighted camera can be utilized to provide input for pointing, tracking, image registration, or focusing.

The foregoing has applications in many diverse areas, including but not limited to biometrics, computer graphics, medical imaging, industrial inspection, change detection, measurement of surface texture, and authentication of objects such as artwork.

In one embodiment, object 100 can be a finger or palm and the slope information identifies the location and orientation of friction ridges or the type and location of minutia on the finger or palm for fingerprint or palm print identification. In a further embodiment, slope information on a friction ridge can provide the direction of steepest decent with respect to the slowly varying underlying surface. The orientation of the friction ridge may be estimated as the direction on the underlying surface that is orthogonal to the direction of steepest decent. In one embodiment, estimates of the orientation of friction ridges at a sparse set of locations can be used to estimate the position and orientation of friction ridges in areas between data points via extending estimates of friction ridge locations along the direction of the orientation of friction ridges. In one embodiment, the estimate of friction ridge locations can be binarized relative to the slowly varying underlying surface slope to emulate fingerprint data obtained via ink transfer or other conventional methods or to match latent fingerprints. In a further embodiment, the location and orientation of friction ridges can be conformally mapped to a flat surface to match conventional fingerprint data or latent fingerprints obtained on a flat surface.

In one embodiment, object 100 can be an ear or a face and slope information provides biometric information. In a further embodiment, slope information can be used for identification or access control. In a further embodiment, slope information can be obtained at long standoff ranges.

In one embodiment, slope information can be used in three-dimensional computer graphics to provide realistic renderings of light distributions for a given object position and orientation with respect to light sources and viewing locations. In one embodiment, slope information can be integrated to provide estimates of three-dimensional shape. In a further embodiment, estimates of three-dimensional shape can be rendered for a particular lighting and viewing geometry. In a further embodiment, estimates of three-dimensional shape can be rendered with lighting and viewing geometries that match existing conventional still images or video images for forensic applications.

In one embodiment, slope information on object 100 can be measured at least two different times and variations in slope information can provide for the detection of changes in object 100. In a further embodiment, change detection can be utilized in medical imaging to monitor changes that occur in a region of the body over time. In one embodiment, change detection can be applied to the detection of skin cancer.

In one embodiment, change detection can be utilized to detect changes in the surface of the earth. In a further embodiment, change detection can be utilized to detect disturbed earth for the purpose of remotely detecting mines or improvised explosive devices.

In one embodiment, slope information can be obtained at video rates. In one embodiment, object 100 can be a person. In a further embodiment, changes that occur over time with respect to the orientation of body components can provide biometric gait information.

In one embodiment, the time variation of slope information on object 100 can be used to monitor or control a manufacturing process. In another embodiment, slope information can be used for the purpose of industrial inspection.

In one embodiment, slope information can be used to authenticate that an object is not a counterfeit. In one embodiment, object 100 can be a sculpture. In another embodiment, object 100 can be a painting. The exemplary embodiments contemplate object 100 being other items that are subject to authentication via one or more of the exemplary imaging systems and/or techniques described herein.

In applying the exemplary embodiments to a specific application, there is a choice for the nominal operating wavelength to be used. Subsurface scattering may affect the speckle pattern received by detector array 175 and may reduce the accuracy to which slope information may be determined. Therefore, it is preferred that a nominal operating wavelength be selected for a particular application that minimizes subsurface scattering for the types of materials encountered. In one embodiment, the nominal wavelength can be in the violet to blue wavelength range to minimize the effects of subsurface scattering from skin and tissue. In another embodiment, the nominal wavelength can be in the short wave infrared (SWIR) wavelength range to minimize the effect of subsurface scattering from skin and tissue. In a further embodiment, a SWIR wavelength between 1400 nm and 1600 nm can be chosen to minimize the effect of subsurface scattering from skin and tissue.

In one embodiment, the nominal operating wavelength can be in the eye safe wavelength range, such as above 1400 nm that does not penetrate the cornea.

In one embodiment, a polarizer can be used in the receiver optical path to substantially block return radiation that has been depolarized through multiple scattering into a polarization state that is orthogonal to the singly-scattered return light.

With respect to the above description then, it is to be realized that the optimum dimensional relationships for the parts of the exemplary embodiments, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The methods described herein can be performed in connection with a machine (e.g., a computer system) within which a set of instructions, when executed, may cause the machine to perform any one or more of the methods discussed above. In some embodiments, the machine may be connected (e.g., using a network) to other machines. In the example of a computer system, there can be a processor (e.g., a central processing unit (CPU), a graphics processing unit (GPU, or both), a main memory and a static memory, which communicate with each other via a bus. The computer system may further include a video display unit (e.g., a liquid crystal display (LCD), a flat panel, or a solid state display. The computer system may include an input device (e.g., a keyboard), a cursor control device (e.g., a mouse), a disk drive unit, a signal generation device (e.g., a speaker or remote control) and a network interface device.

The disk drive unit may include a tangible computer-readable storage medium on which is stored one or more sets of instructions (e.g., software) embodying any one or more of the methods or functions described herein, including those methods illustrated above. The instructions may also reside, completely or at least partially, within the main memory, the static memory, and/or within the processor during execution thereof by the computer system. The main memory and the processor also may constitute tangible computer-readable storage media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein. The tangible computer-readable storage medium should be understood to include a single medium or multiple media (e.g., a centralized or distributed database, and/or associated caches and servers) that store the one or more sets of instructions. The term "tangible computer-readable storage medium" shall also be taken to be any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Therefore, the foregoing is considered as illustrative only of the principles of the invention. Further, since numerous modifications and changes will readily occur to those skilled in the art, it is not desired to limit the exemplary embodiments to the exact construction and operation shown and described, and accordingly, all suitable modifications and equivalents may be resorted to, falling within the scope of the exemplary embodiments and claims. Although the exemplary embodiments have been described in the above forms with a certain degree of particularity, it is understood that the present disclosure has been made only by way of example and numerous changes in the details of construction and combination and arrangement of parts may be resorted to without departing from the spirit and scope of the exemplary embodiments.

We claim:

1. A method comprising:
    illuminating a neighborhood of a location on an object with a first beam of coherent radiation at a first wavelength;
    obtaining a first defocused image of the neighborhood illuminated with the first wavelength, the first defocused image comprising a first speckle pattern;

illuminating the neighborhood with a second beam of coherent radiation at a second wavelength;

obtaining a second defocused image of the neighborhood illuminated with the second wavelength, the second defocused image comprising a second speckle pattern;

determining a shift between the first and second speckle patterns; and calculating slope information of a surface profile at the location based on the determined shift.

2. The method of claim 1, wherein the first and second beams of coherent radiation are substantially collinear.

3. The method of claim 1, comprising selecting widths of the first and second beams of coherent radiation to enable resolution of variations of the slope information at a desired spatial resolution of the surface profile.

4. The method of claim 1, wherein the determining of the shift comprises:

generating a shifted digital representation of the second speckle pattern relative to a digital representation of the first speckle pattern for a trial shift value;

generating a difference map between the shifted digital representation of the second speckle pattern and the digital representation of the first speckle pattern over a region of overlap of the digital representations; and determining the shift by selecting the trial shift value to reduce a measure of a magnitude of the difference map.

5. The method of claim 1, wherein the shift is determined to sub-pixel precision.

6. The method of claim 1, wherein the slope information is an estimate of a normal vector to a surface at the location.

7. The method of claim 1, comprising:

illuminating the object at multiple locations; and obtaining the slope information from the first and second defocused images for the multiple locations.

8. The method of claim 7, wherein the first and second defocused images do not substantially overlap.

9. The method of claim 7, wherein the illumination at the multiple locations occurs simultaneously.

10. The method of claim 7, wherein the illumination at the multiple locations is produced by a beam replicating element that generates a pattern of replicated beams.

11. The method of claim 10, wherein the beam replicating element is a diffractive optical element beam splitter.

12. The method of claim 10, wherein the pattern of replicated beams is translated laterally relative to the object to acquire additional slope information for the object within gaps in prior positions of the multiple locations.

13. The method of claim 1, wherein the illuminating at a first wavelength and the illuminating at a second wavelength occur simultaneously.

14. The method of claim 13, wherein the first and second defocused images corresponding to the first wavelength and the second wavelength are displaced by a dispersive element to produce substantially non-overlapping defocused images.

15. The method of claim 14, wherein the dispersive element is a diffraction grating.

16. The method of claim 14, wherein the substantially non-overlapping defocused images corresponding to the first wavelength and the second wavelength do not substantially overlap with other defocused images that are produced when the object is illuminated at the multiple locations.

17. The method of claim 13, wherein a wavelength-selective element directs the first defocused image corresponding to the first wavelength to a first detector array or first region of a detector array and the second defocused image corresponding to the second wavelength to a second detector array or second region of the first detector array.

18. The method of claim 13, wherein a time-varying wavelength selective element alternately passes the first wavelength and the second wavelength.

19. The method of claim 13, further comprising utilizing a patterned array of wavelength-selective elements that renders adjacent pixels of a detector array alternately sensitive to the first wavelength and the second wavelength.

20. The method of claim 13, wherein the simultaneous illuminating at a first and a second wavelength is pulsed to minimize time-varying contributions to the shift that are not related to the slope information.

21. The method of claim 1, wherein the illuminating at a first wavelength and the illuminating at a second wavelength occur sequentially and the receiving of a defocused image comprises utilizing a detector array to acquire the first speckle pattern and the second speckle sequentially.

22. The method of claim 21, wherein time-varying contributions to the shift that are not related to the slope information are mitigated by pulsing the first beam of radiation and the second beam of radiation such that the pulses occur close together in time and straddle image frames of the detector array.

23. The method of claim 21, further comprising:

illuminating the neighborhood of the location with a third beam of coherent radiation at a first wavelength;

receiving a third defocused image of the neighborhood illuminated with the first wavelength, the third defocused image comprising a third speckle pattern;

determining a second shift between the first and third speckle patterns; and utilizing the second shift between the first and the third speckle patterns to compensate for contributions to the shift between the first and the second speckle patterns that are not related to the slope information.

24. The method of claim 1, wherein the illuminating at a first wavelength and the illuminating at a second wavelength are implemented as a time-varying wavelength scan.

25. The method of claim 24, further comprising utilizing a rapidly repeating time-varying wavelength scan and a Geiger-mode avalanche photodiode array providing photon arrival times at pixels, wherein the photon arrival times map to the wavelength of the time-varying wavelength scan and the contributions to the shift that are not related to the slope information are obtained from speckle motion between points in the time-varying wavelength scan having the same wavelength.

26. The method of claim 1, wherein a variation of speckle size or motion of speckle that is caused by sideways translation of the first and second beams of coherent radiation relative to the object provide feedback for adjusting the focus of the first and second beams of coherent radiation on the object.

27. The method of claim 1, further comprising obtaining images using a boresighted camera, for registering multiple locations on the object when motion occurs between measurements.

28. The method of claim 1, wherein the object comprises a finger or a palm, and wherein the slope information identifies the location and orientation of friction ridges or location and type of minutia on the finger or the palm.

29. The method of claim 28, wherein the slope information provides the direction of steepest decent at the location on the friction ridge from which ridge orientation is determined.

30. The method of claim 1, wherein the object comprises a face or ear, and wherein the slope information provides biometric information.

31. The method of claim 1, wherein the slope information is measured at least two different times, and wherein variations in the slope information provide change detection of the surface profile of the object.

32. The method of claim 1, wherein the object is a person, and wherein a temporal variation of the slope information provides biometric gait information.

33. The method of claim 1, wherein a nominal wavelength of the first and second beams of coherent radiation is either in a violet to blue wavelength range or a shortwave infrared wavelength range.

34. The method of claim 1, wherein a nominal wavelength of the first and second beams of coherent radiation is greater than 1400 nm.

35. An apparatus comprising:
a memory; and
a processor coupled with the memory and operable to:
obtain a first speckled pattern of a first defocused image of a neighborhood of a location on an object, the first defocused image being obtained based on a first illumination of the neighborhood by a first beam of coherent radiation at a first wavelength;
obtain a second speckled pattern of a second defocused image of the neighborhood, the second defocused image being obtained based on a second illumination of the neighborhood by a second beam of coherent radiation at a second wavelength;
determining a shift between the first and second speckle patterns; and
calculating slope information of a surface profile at the location based on the determined shift.

36. The apparatus of claim 35, wherein the illumination source comprises a beam replicating element that generates a pattern of replicated beams at multiple locations on the object.

37. The apparatus of claim 35, wherein the beam replicating element is a diffractive optical element beam splitter.

38. The apparatus of claim 37, further comprising a boresighted camera for registering the multiple locations on the object when motion occurs between measurements.

39. The apparatus of claim 35, further comprising:
a rapidly repeating time-varying wavelength scan; and
a Geiger-mode avalanche photodiode array providing photon arrival times at pixels,
wherein the photon arrival times map to the wavelength of the time-varying wavelength scan and the contributions to the shift that are not related to the slope information are obtained from speckle motion between points in the time-varying wavelength scan having the same wavelength.

40. The apparatus of claim 35, further comprising an illuminating source operably coupled to the processor for generating the first and second beams of coherent radiation.

41. A non-transitory computer-readable storage medium comprising computer instructions for:
illuminating a neighborhood of a location on an object with a first beam of coherent radiation at a first wavelength;
obtaining a first defocused image of the neighborhood illuminated with the first wavelength, the first defocused image comprising a first speckle pattern;
illuminating the neighborhood with a second beam of coherent radiation at a second wavelength; and
obtaining a second defocused image of the neighborhood illuminated with the second wavelength, the second defocused image comprising a second speckle pattern,
wherein a shift between the first and second speckle patterns is determined, and wherein slope information of a surface profile at the location is determined based on the shift.

42. The non-transitory computer-readable storage medium of claim 41, comprising computer instructions for determining the shift by:
generating a shifted digital representation of the second speckle pattern relative to a digital representation of the first speckle pattern for a trial shift value;
generating a difference map between the shifted digital representation of the second speckle pattern and the digital representation of the first speckle pattern over a region of overlap of the digital representations; and
determining the shift by selecting the trial shift value to reduce a measure of a magnitude of the difference map.

43. The non-transitory computer-readable storage medium of claim 41, comprising computer instructions for:
illuminating the object at multiple locations; and
obtaining the slope information from the first and second defocused images for the multiple locations.

* * * * *